United States Patent
Quatrano

(10) Patent No.: US 12,441,155 B2
(45) Date of Patent: Oct. 14, 2025

(54) MIDPLANE-MOUNTED STABILIZER BAR LINK BRACKET

(71) Applicant: Ford Global Technologies, LLC, Dearborn, MI (US)

(72) Inventor: Nicholas Anthony Quatrano, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/488,271

(22) Filed: Oct. 17, 2023

(65) Prior Publication Data

US 2025/0121646 A1    Apr. 17, 2025

(51) Int. Cl.
*B60G 21/055* (2006.01)
*F16C 11/06* (2006.01)

(52) U.S. Cl.
CPC ............ *B60G 21/055* (2013.01); *F16C 11/06* (2013.01)

(58) Field of Classification Search
CPC .............. B60G 21/055; B60G 21/0551; B60G 2204/4304; B60G 15/068; F16C 11/06
USPC ................... 403/187; 280/124.152
See application file for complete search history.

(56) References Cited

U.S. PATENT DOCUMENTS

| | | | |
|---|---|---|---|
| 6,305,701 B1 | 10/2001 | Bobinger et al. | |
| 6,692,012 B2 | 2/2004 | Fullenkamp et al. | |
| 8,579,312 B2 * | 11/2013 | Koumura | B60G 21/0551 280/124.152 |
| 9,476,447 B2 * | 10/2016 | Schmidt | B60G 7/005 |
| 10,632,938 B2 * | 4/2020 | Tamura | B60G 7/001 |
| 10,906,372 B2 * | 2/2021 | Shibuya | B60K 7/0007 |
| 11,041,524 B2 * | 6/2021 | Kuroda | B60G 21/0551 |
| 11,465,489 B2 * | 10/2022 | Nagayama | B60G 3/06 |
| 12,194,802 B1 * | 1/2025 | Ravichandran | B60G 21/0551 |
| 2011/0085848 A1 * | 4/2011 | Kim | F16F 9/54 403/187 |

(Continued)

FOREIGN PATENT DOCUMENTS

| | | |
|---|---|---|
| CN | 103121387 A | 5/2013 |
| EP | 4067125 A1 | 10/2022 |
| JP | 2014058220 A | 4/2014 |

(Continued)

OTHER PUBLICATIONS

Hyung KR20120021839A English Translation with original document, retrieved Dec. 5, 2024 (Year: 2012).*

*Primary Examiner* — Paul N Dickson
*Assistant Examiner* — Caitlin Anne Miller
(74) *Attorney, Agent, or Firm* — Burr & Forman; Lorne Forsythe

(57) ABSTRACT

A suspension assembly for a vehicle may be provided. The suspension assembly may include a strut operably coupled to a body of the vehicle, a stabilizer bar operably coupled to the strut to reduce body roll, a strut stabilizer bar link to operably couple the stabilizer bar to the strut; and a strut stabilizer bar link bracket. The suspension assembly may include the strut stabilizer bar link bracket extending from a midplane of the strut containing a longitudinal axis of the strut to operably couple the strut stabilizer bar link to the strut regardless of a side of the vehicle on which the strut is located. The strut stabilizer bar link may include a first ball joint to operably couple the strut stabilizer bar link to the strut stabilizer bar link bracket.

20 Claims, 8 Drawing Sheets

(56) References Cited

U.S. PATENT DOCUMENTS

2016/0280037 A1\* 9/2016 Steinkamp ............ B60G 21/055
2017/0313154 A1\* 11/2017 Kuroda .................. B60G 7/005

FOREIGN PATENT DOCUMENTS

| KR | 20060018598 A | 3/2006 |
| KR | 20110021460 A | 3/2011 |
| KR | 20110096357 A | 8/2011 |
| KR | 101511482 B1 | 4/2015 |

\* cited by examiner

MIDPLANE-MOUNTED STABILIZER BAR LINK BRACKET

TECHNICAL FIELD

Example embodiments generally relate to suspension components and, more particularly, relate to a bracket for securing a stabilizer bar link to a strut of a vehicle.

BACKGROUND

Many modern vehicles may utilize a MacPherson strut suspension design, or a variation thereof, due to the MacPherson strut's relative lack of complexity and ease of manufacture. The MacPherson strut construction may include various suspension components which may include, but not be limited to, a strut, a stabilizer bar (i.e. a sway bar or anti roll bar), a stabilizer bar link, and a strut stabilizer bar link bracket. The stabilizer bar link may include ball joints that may operably couple the stabilizer bar link to the strut and to the stabilizer bar, respectively, via the strut stabilizer bar link bracket.

The strut stabilizer bar link brackets may typically be embodied in two types of suspension assemblies of varying degrees of complexity. In a high complexity suspension assembly, the strut stabilizer bar link bracket may be mounted on the front of the strut. However, a front mounted strut stabilizer bar link bracket on the driver side of the vehicle would be a rear mounted strut stabilizer bar link bracket on the passenger side of the vehicle, thereby rendering the strut stabilizer bar link bracket unusable on one side of the vehicle. Thus, this may require the struts to be "handed" which may decrease efficiency when manufacturing and installing the suspension assembly since there are separate right handed and left handed struts that must be made and managed during installation. In a low complexity suspension assembly, two strut stabilizer bar link brackets may be mounted on the front and rear of the strut to achieve a non-handed structure that can be disposed on either side of the vehicle. However, this may come at the expense of efficiency and add additional weight. Therefore, there may be a need to further simplify the strut stabilizer bar link bracket without compromising efficiency and weight.

BRIEF SUMMARY OF SOME EXAMPLES

In accordance with an example embodiment, a suspension assembly for a vehicle suspension system of an example embodiment. The suspension assembly may include a strut operably coupled to a body of the vehicle, a stabilizer bar operably coupled to the strut to reduce body roll, a strut stabilizer bar link to operably couple the stabilizer bar to the strut; and a strut stabilizer bar link bracket. The suspension assembly may include the strut stabilizer bar link bracket extending from a midplane of the strut containing a longitudinal axis of the strut to operably couple the strut stabilizer bar link to the strut regardless of a side of the vehicle on which the strut is located. The strut stabilizer bar link may include a first ball joint to operably couple the strut stabilizer bar link to the strut stabilizer bar link bracket.

In another example embodiment, a strut stabilizer bar link bracket for a suspension system of a vehicle may be provided. The strut stabilizer bar link bracket may include a receiving orifice to receive a first ball joint of a stabilizer bar link for installation at both a first side and a second side of the vehicle. The strut stabilizer bar link bracket may include a concave structure to receive the first ball joint inside the concave structure for installation at the first side of the vehicle and may receive a fastener operably coupled to the first ball joint for installation at the second side of the vehicle. The strut stabilizer bar link bracket may further extend from a midplane of the strut containing a longitudinal axis of the strut to operably couple the strut stabilizer bar link to the strut regardless of a side of the vehicle on which the strut is located.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
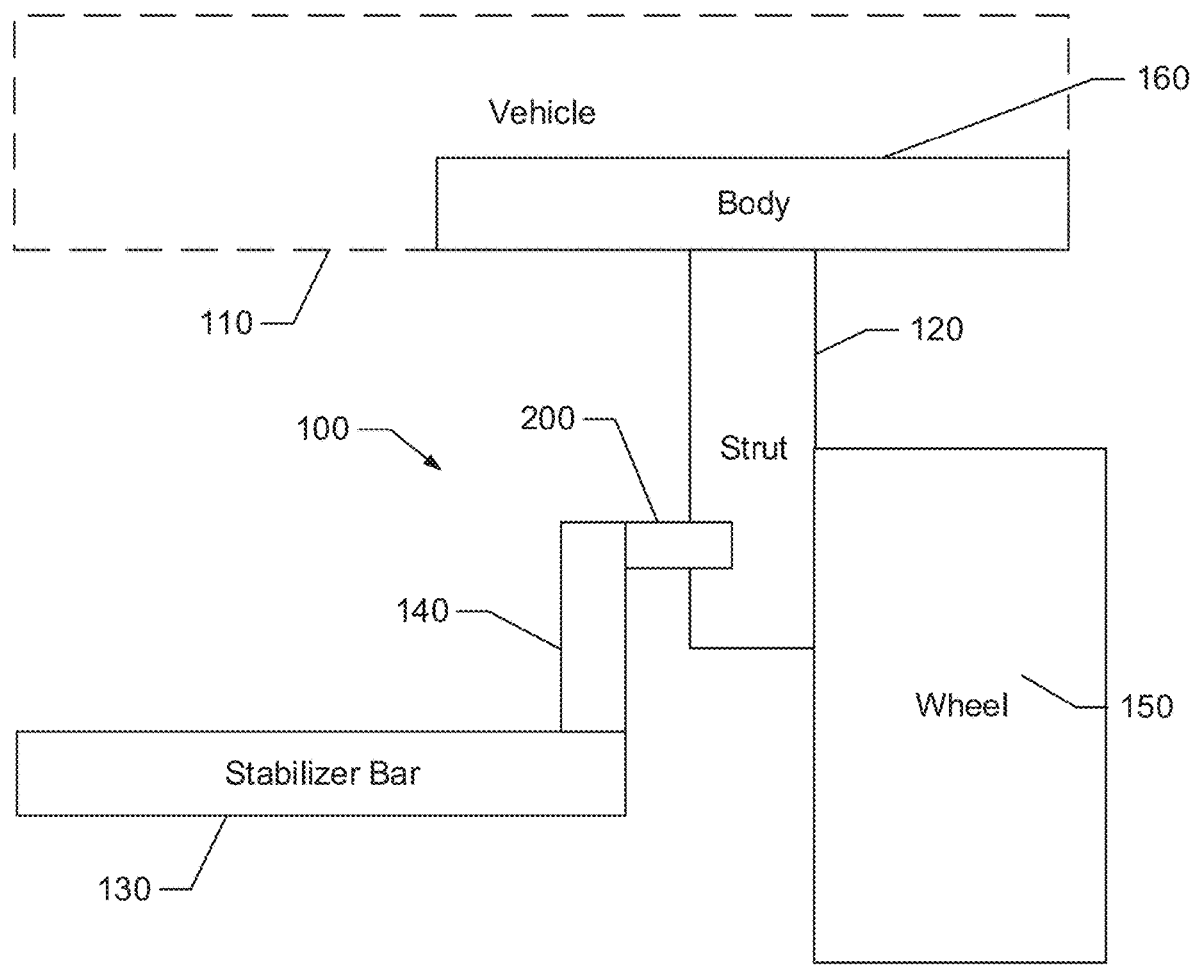
FIG. 1 illustrates a block diagram of a suspension assembly for a vehicle suspension system in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein may address the problems described above. In this regard, for example, some embodiments may provide a strut stabilizer bar link bracket for a suspension system of a vehicle that may make the stabilizer bar link, and the suspension system as a whole, simpler and more efficient to install. Some embodiments may provide for the strut stabilizer bar link bracket to be installed non-handedly without requiring multiple strut stabilizer bar link brackets for use on either side of the vehicle. As a result, installation of the suspension assembly may require less effort, fewer components, less time and thus may be more efficient.

Figure 2:
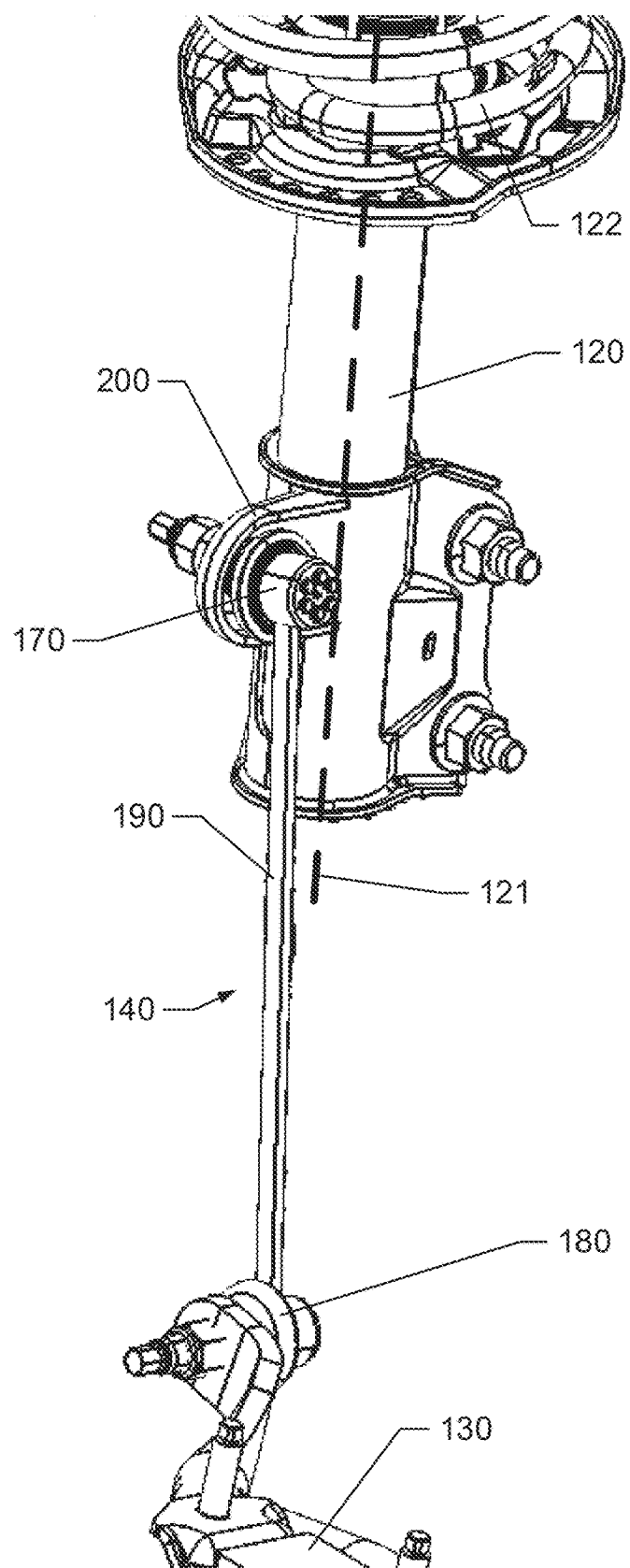
FIG. 2 depicts a perspective view of the suspension assembly in accordance with an example embodiment.

FIG. 1 illustrates a block diagram of the suspension assembly 100 of a vehicle 110 according to an example embodiment, and FIG. 2 illustrates a perspective view of the suspension assembly 100 of a vehicle 110 in accordance with an example embodiment. As seen in FIGS. 1 and 2, in some embodiments, the suspension assembly 100 may include a strut 120, a stabilizer bar 130, a stabilizer bar link 140, and a strut stabilizer bar link bracket 200. The strut 120 may operably couple to a wheel 150 of the vehicle 110 and to a body 160 of the vehicle 110. In some cases, the strut 120 may be a shock/spring combination that may permit the wheel 150 to articulate up and down along a direction parallel to a longitudinal axis 121 of the strut 120. In this regard, the strut 120 may dampen the articulation of the wheel 150 so that the movement of the wheel 150 may not get translated directly into movement of the body 160. In doing so, the strut 120 may increase the quality of the ride as perceived by passengers within the body 160 of the vehicle 110 by absorbing some of the force from bumps due to the articulation of the wheel 150. Additionally, in an example embodiment, the suspension assembly 100 may be a form of a MacPherson strut construction, and in this regard, the strut 120 may also play a role in the steering of the vehicle 110. As such, the strut 120 may be operably coupled to a control arm and may act as a steering pivot for the wheel 150. Regardless, in some cases, the strut 120 may be substantially cylindrical in shape and may include a spring 122 disposed around a damper through which the longitudinal axis 121 may extend. The longitudinal axis may extend through the middle of the strut 120, as shown in FIG. 2.

The stabilizer bar 130 may be operably coupled to the strut 120 at a first end of the stabilizer bar 130, and also to another strut 120 which may be disposed at the opposite side of the vehicle 110 at a second end of the stabilizer bar 130. The main function of the stabilizer bar 130 may be to reduce body 160 roll of the vehicle 110, especially through turns. In this regard, during a turn (and also during bumps), the body 160 of the vehicle 110 may tend to tilt as the center of mass of the vehicle 110 may shift laterally towards an outer side of the vehicle 110 on the outer edge of the turn. As this happens, the suspension assembly 100 at the outer side of the vehicle 110 may compress through the turn. Thus, the stabilizer bar 130 may be operably coupled to the struts 120 on both sides of the vehicle 110 so that as the vehicle 110 turns, the struts 120 on both sides of the vehicle 110 may compress together to keep the vehicle 110 more level through the turn. In other words, by preventing the outermost strut 120 from compressing more than the innermost strut 120 during a turn, the stabilizer bar 130 may keep the vehicle 110 more level through the turn. As such, the stabilizer bar 130 may also be referred to as an anti-roll bar, sway bar, roll bar, anti-sway bar, or another similar type of naming preference. As shown in FIGS. 1 and 2, the stabilizer bar 130 may extend substantially horizontally and substantially below the strut 120. In some cases, the stabilizer bar 130 may be substantially tube shaped for a majority of its length. In an example embodiment, the stabilizer bar 130, where it may operably couple to the strut 120, may be pressed into a flattened section or portion to enhance the operable coupling to the stabilizer bar link 140 accordingly.

As seen in FIGS. 1 and 2, the stabilizer bar link 140 may operably couple the stabilizer bar 130 to the strut 120. The stabilizer bar link 140 of some embodiments may include a first ball joint 170 which may operably couple the stabilizer bar link 140 to the strut 120, a second ball joint 180 which may operably couple the stabilizer bar link 140 to the stabilizer bar 130, and a rod 190 which may extend from the first ball joint 170 to the second ball joint 180. In some cases, the first ball joint 170 may be an upper ball joint and the second ball joint 180 may be a lower ball joint, which may be disposed below the first ball joint 170. Therefore, within the context of the stabilizer bar 130 described above, the stabilizer bar link 140 may transfer force to the stabilizer bar 130 during a turn via the first and second ball joints (170, 180) and the rod 190. As described above, the force being transferred may be due to the weight of the vehicle 110 which may be exerted on the strut 120 disposed on the outer side of the vehicle 110 during a turn. Thus, in order to distribute that force to the strut 120 disposed at the opposite side of the vehicle 110 (i.e. the inner side during the turn) to keep the vehicle 110 more level through the turn, the first and second ball joints (170, 180) may need to be strong and durable operable couplings to withstand the repeated stress put on the components operably coupled thereto.

The suspension assembly 100 may further include a strut stabilizer bar link bracket 200 operably coupled to the strut 120. The strut stabilizer bar link bracket 200 may be disposed on an exterior of the strut 120 and may extend substantially away from the strut 120. In some cases, the strut stabilizer bar link bracket 200 may be permanently operably coupled to an exterior surface of the strut 120. In other words, in some cases the strut stabilizer bar link bracket 200 may be formed into a housing of the strut 120, whereas in other cases, the strut stabilizer bar link bracket 200 may be otherwise operably coupled to the strut 120, perhaps being welded to the strut 120.

Referring now to FIGS. 3-8, the strut stabilizer bar link bracket 200 may include a receiving orifice 210 disposed therein. In this regard, the first ball joint 170 may operably couple to the strut stabilizer bar link bracket 200 via the receiving orifice 210. The first ball joint 170 may be operably coupled to the strut stabilizer bar link bracket 200 via a first shaft 175 that may extend through the receiving orifice 210, and may be secured thereto by a fastener 220. The fastener 220 may be threaded onto the first shaft 175 at an opposite side of the strut stabilizer bar link bracket 200 from the first ball joint 170. The second ball joint 180 may be secured to the stabilizer bar 130 via a second shaft 185 and secured by an additional fastener 220. The first and second shafts (175, 185) may extend substantially away from the stabilizer bar link 140 in a direction that in some cases may be approximately perpendicular to the direction of extension of the rod 190. The first ball joint 170 may include the first shaft 175, and the second ball joint 180 may include the second shaft 185. The first and second ball joints (170, 180) may be ball and socket type joints. As such, the first and second shafts (175, 185) may be free to pivot and rotate relative to a main housing portion (177, 187) of the respective first and second ball joints (170, 180). Thus, the first and second shafts (175, 185) may not always be oriented approximately perpendicular to the direction of extension of the rod 190. Accordingly, the first and second ball joints (170, 180) and the strut stabilizer bar link bracket 200 may allow the strut 120 and the stabilizer bar link to form an angle between 0 and 90 degrees with each other.

In some cases, the receiving orifice 210 may be a round or circular orifice. However, in other cases, the receiving orifice 210 may be embodied as a number of shapes. For example, the receiving orifice may be triangular, square, rectangular, pentagonal, octagonal, cross shaped, x shaped, torx shaped, or any other shape capable of resisting rotational forces.

Figure 4:
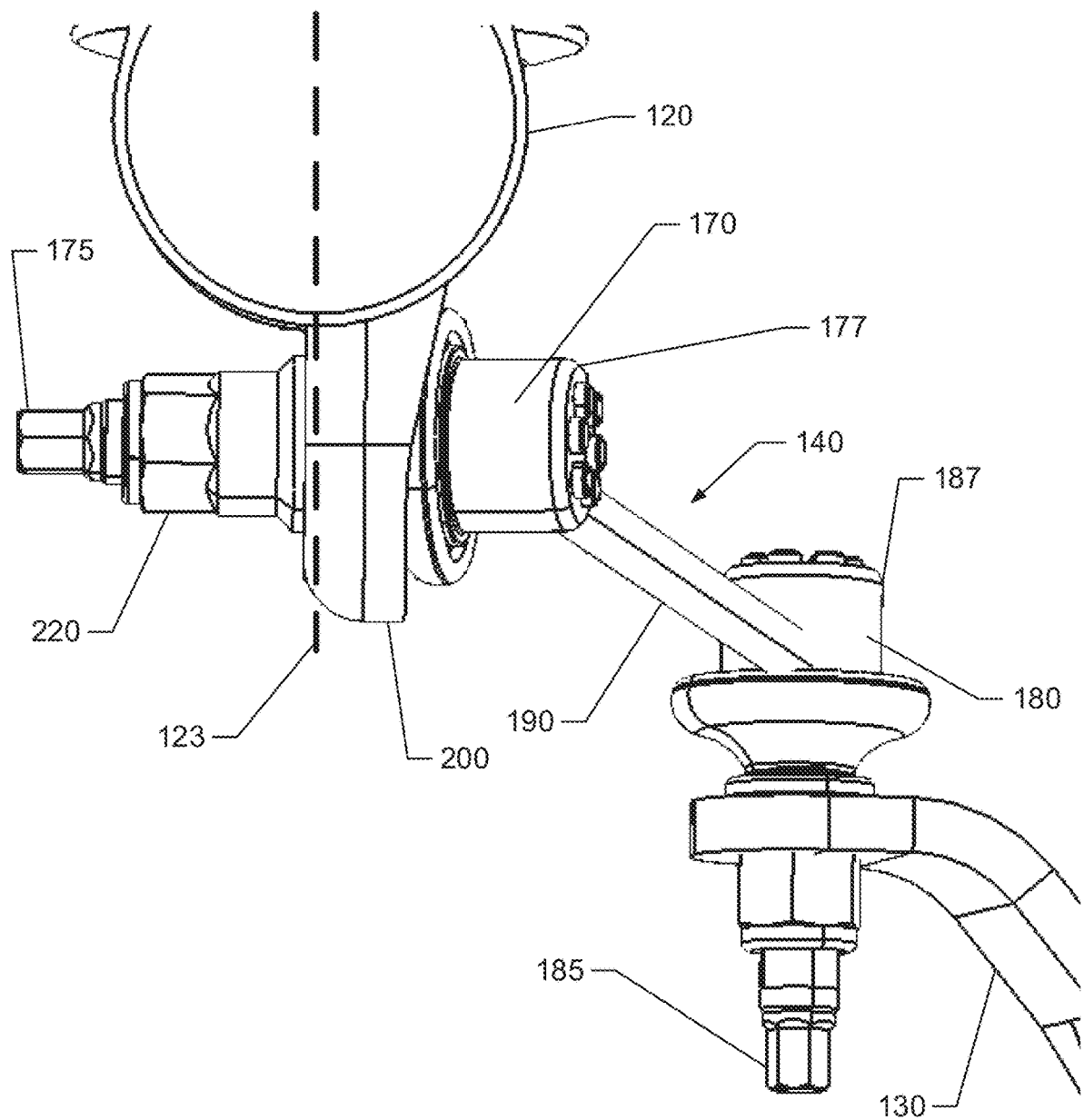
FIG. 4 depicts a top perspective view of the suspension assembly in accordance with an example embodiment.

In an example embodiment, the first ball joint 170 and the second ball joint may be rotated by approximately 90 degrees from each other, as shown in FIG. 4. In other words, the first and second shafts (175, 185) may be orientated to extend 90 degrees from each other or be substantially perpendicular. In this regard, the phase of the first and second ball joints (170, 180) may allow for the stabilizer bar link 140 to optimally bias the first and second ball joints (170, 180) through turn and travel. In other words, the phase of the first and second ball joints (170, 180) may allow for an effective length of the stabilizer bar link 140 to be increased or decreased based to reduce strain on the first and second ball joints (170, 180) through vehicle 110 operation. The biasing thus allows for increased body roll reduction throughout the operation of the vehicle 110. In some embodiments, the stabilizer bar link may extend away from the midplane 123 of the strut 120 from the first ball joint 170 to the second ball joint 180, at least partially due to the position and orientation of the first and second ball joints (170, 180).

Figure 3:
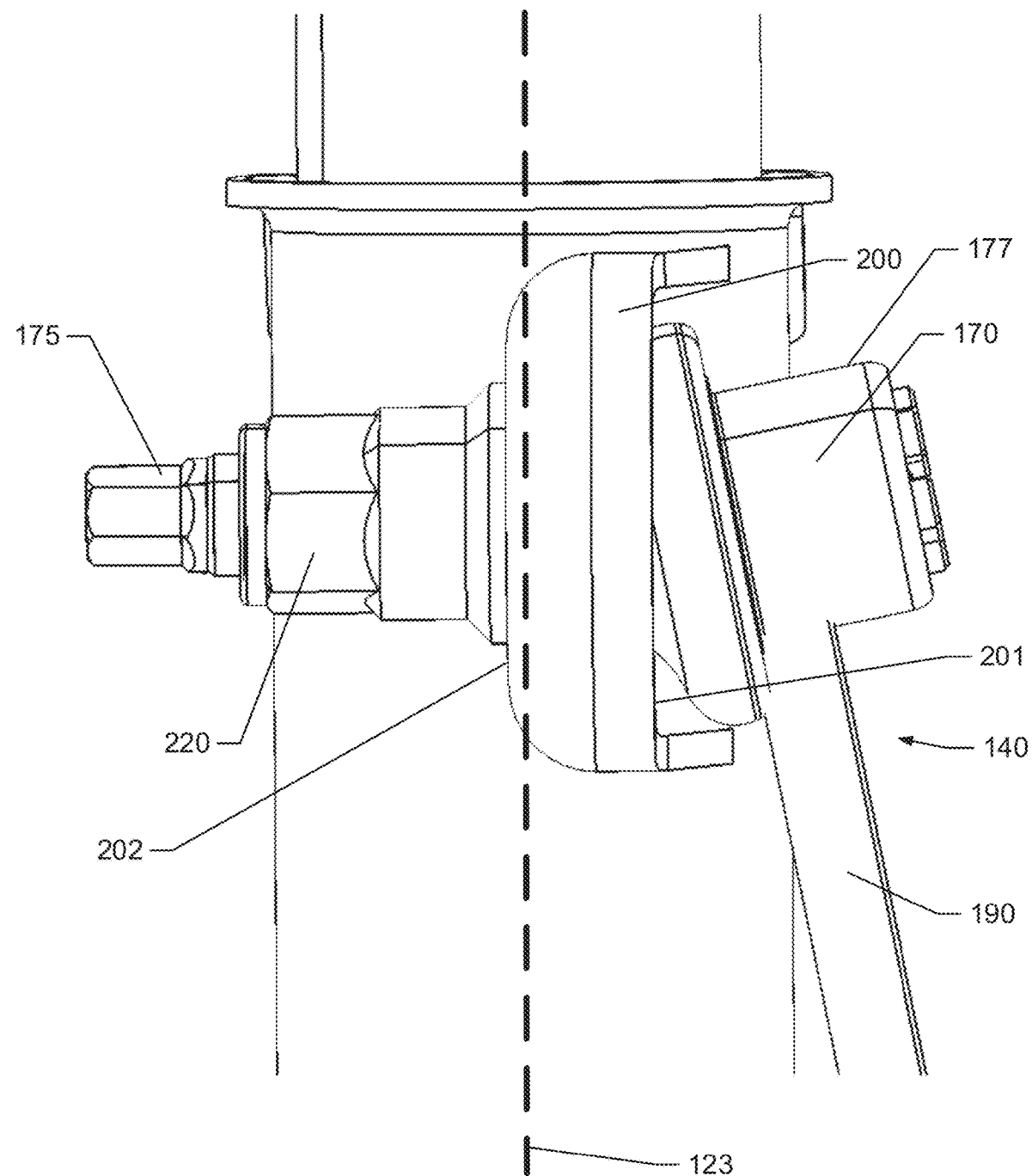
FIG. 3 illustrates a side view of the strut stabilizer bar link bracket and stabilizer bar link in accordance with an example embodiment.

As mentioned above, the fastener 220 may be threaded onto the first shaft 175 on an opposite side of the strut stabilizer bar link bracket 200, and thus the receiving orifice 210, from the stabilizer bar link 140 to removably operably couple the first ball joint 170 to the strut stabilizer bar link bracket 200. The strut stabilizer bar link bracket 200 may further include a front side 201 and a back side 202. The first shaft 175 may extend through the receiving orifice 210 from either the front side 201 or the back side 202 of the strut stabilizer bar link bracket 200 and operably couple to the fastener 220 to operably couple the stabilizer bar link 140 to the strut 120. In some cases, the front and back sides (201, 202) may be substantially planar and parallel with each other. In an example embodiment, the first shaft 175 may extend perpendicularly to the front and back sides (201, 202). In some cases, when the strut 120 is on one side of the vehicle 110, the fastener 220 may be secured on the first shaft 175 on the back side 202 of the strut stabilizer bar link bracket 200, as shown in FIG. 3 for example. In some cases, when the strut 120 is on opposite side of the vehicle, the fastener 220 may be secured on the first shaft 175 on the front side 201 of the strut stabilizer bar link bracket 200.

The suspension assembly 100 may include midplane 123 of the strut 120. The midplane 123 of the strut 120 may bisect the strut 120, along the diameter of the strut 120, and may be substantially parallel to the direction of extension of stabilizer bar 130. The midplane of the strut 120 may contain the longitudinal axis 121 of the strut 120. The strut stabilizer bar link bracket 200 may extend from the midplane 123 of the strut 120 so that the first shaft 175 (i.e. the stabilizer bar link 140) extends through the midplane 123 of the strut 120, which may increase the performance of the suspension assembly 100. In some cases, the midplane 123 may contain a central portion the receiving orifice 210 of strut stabilizer bar link bracket 200. In an example embodiment, the midplane 123 may bisect the receiving orifice 210 and may be substantially parallel to the direction of extension of stabilizer bar 130. In some cases, a plane of the strut stabilizer bar link bracket 200 and the midplane 123 of the strut 120 may be coincident with one another. Performance of the suspensions assembly may also be increased due to the stabilizer bar link 140 (more specifically the first ball joint 170) being closer to an axis of the strut (midplane 123), which helps reduce motion during a turn performed by the vehicle 110.

The strut stabilizer bar link bracket 200 may further allow for the same suspension assembly 100 to be used on both driver and passenger sides of the vehicle 110 without further modification. Thus, the strut stabilizer bar link bracket 200 reduces complexity of the suspension assembly while increasing efficiency and decreasing weight by being non-handed with only a single instance of the strut stabilizer bar link bracket 200 that can be used one both sides of the vehicle 110, as shown in FIG. 8.

Figure 5:
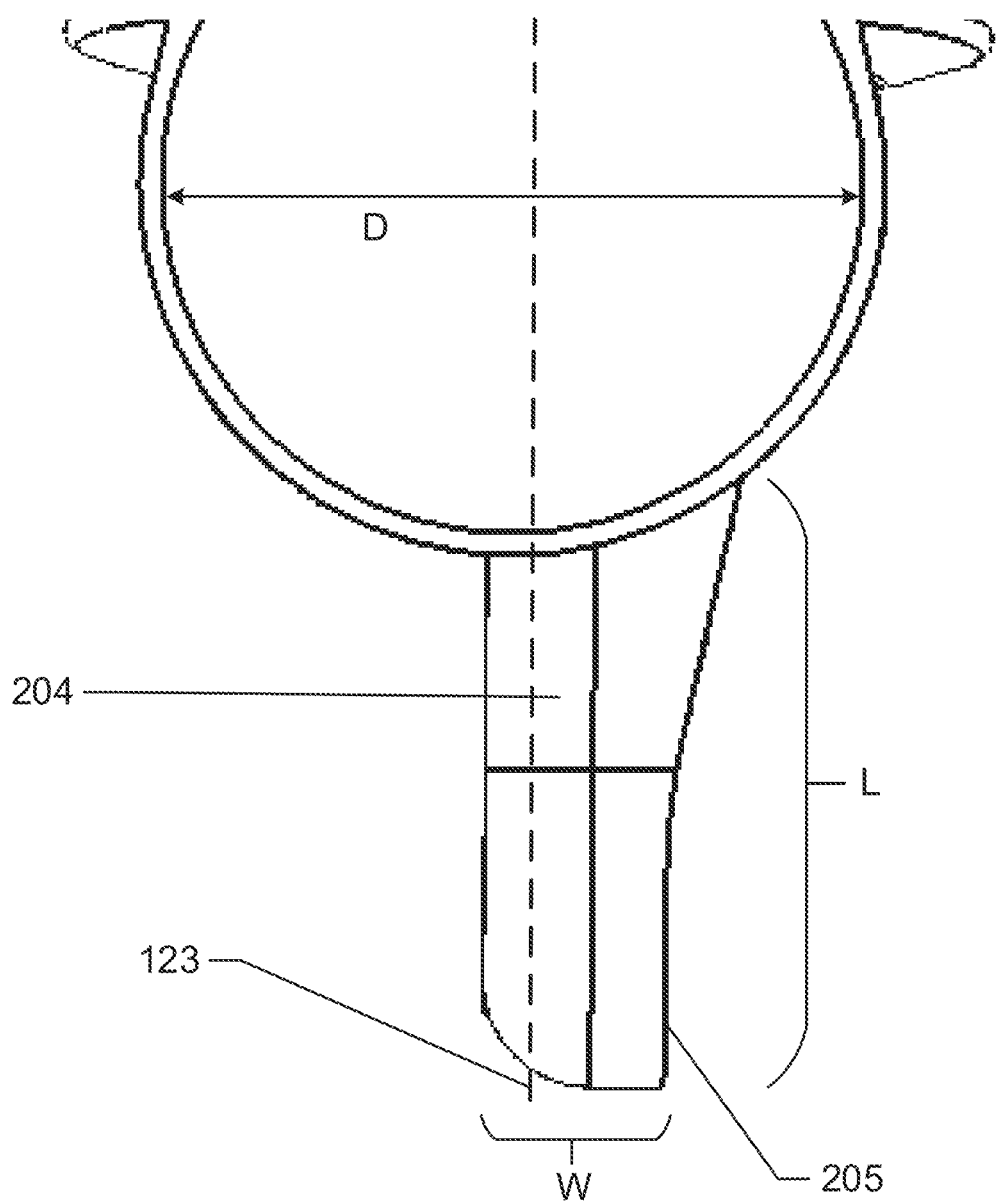
FIG. 5 illustrates a top view of the strut and strut stabilizer bar link bracket in accordance with an example embodiment.
Figure 6:
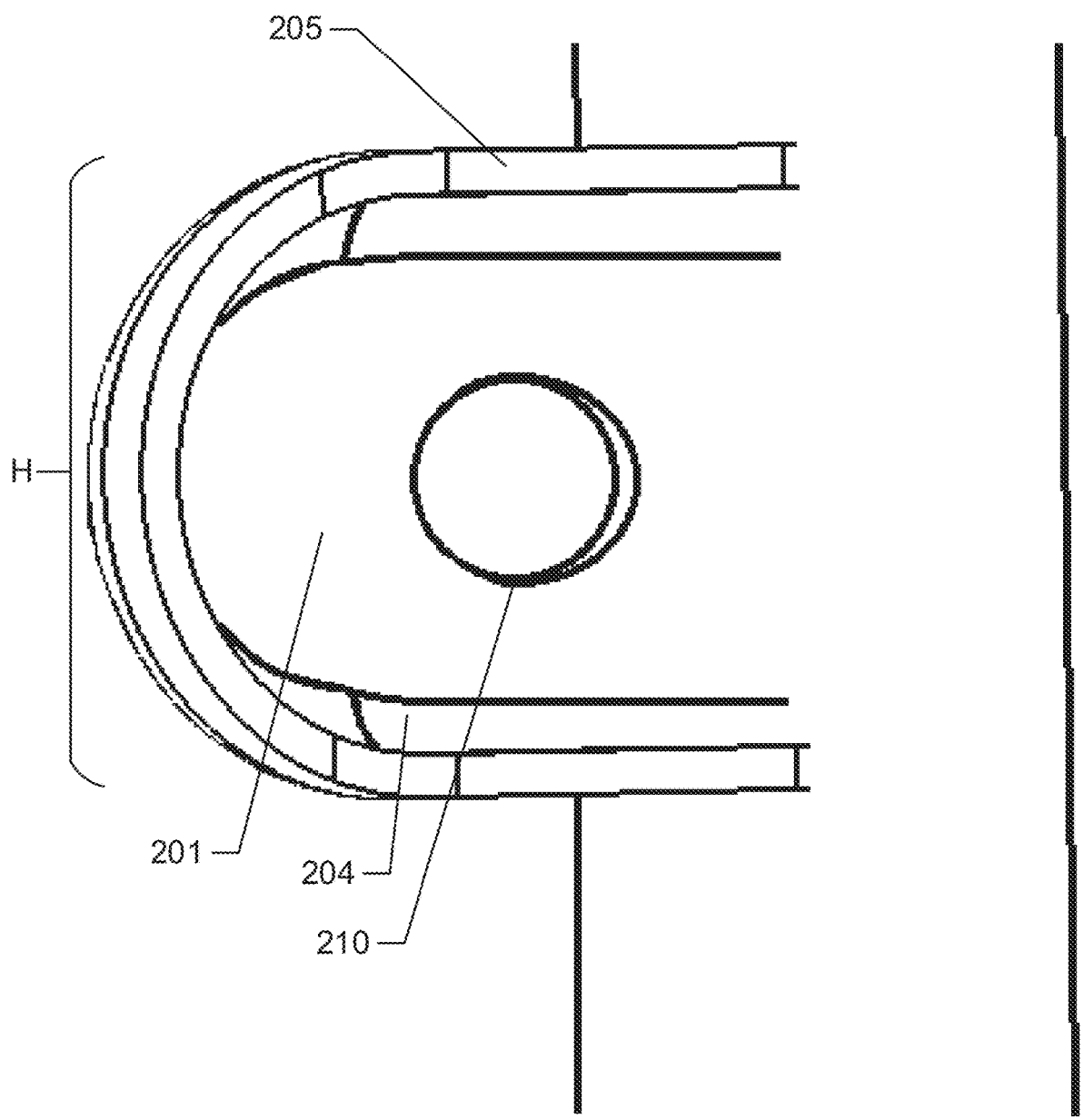
FIG. 6 illustrates a close up perspective view of the strut stabilizer bar link bracket with the first ball joint removed in accordance with an example embodiment.
Figure 7:
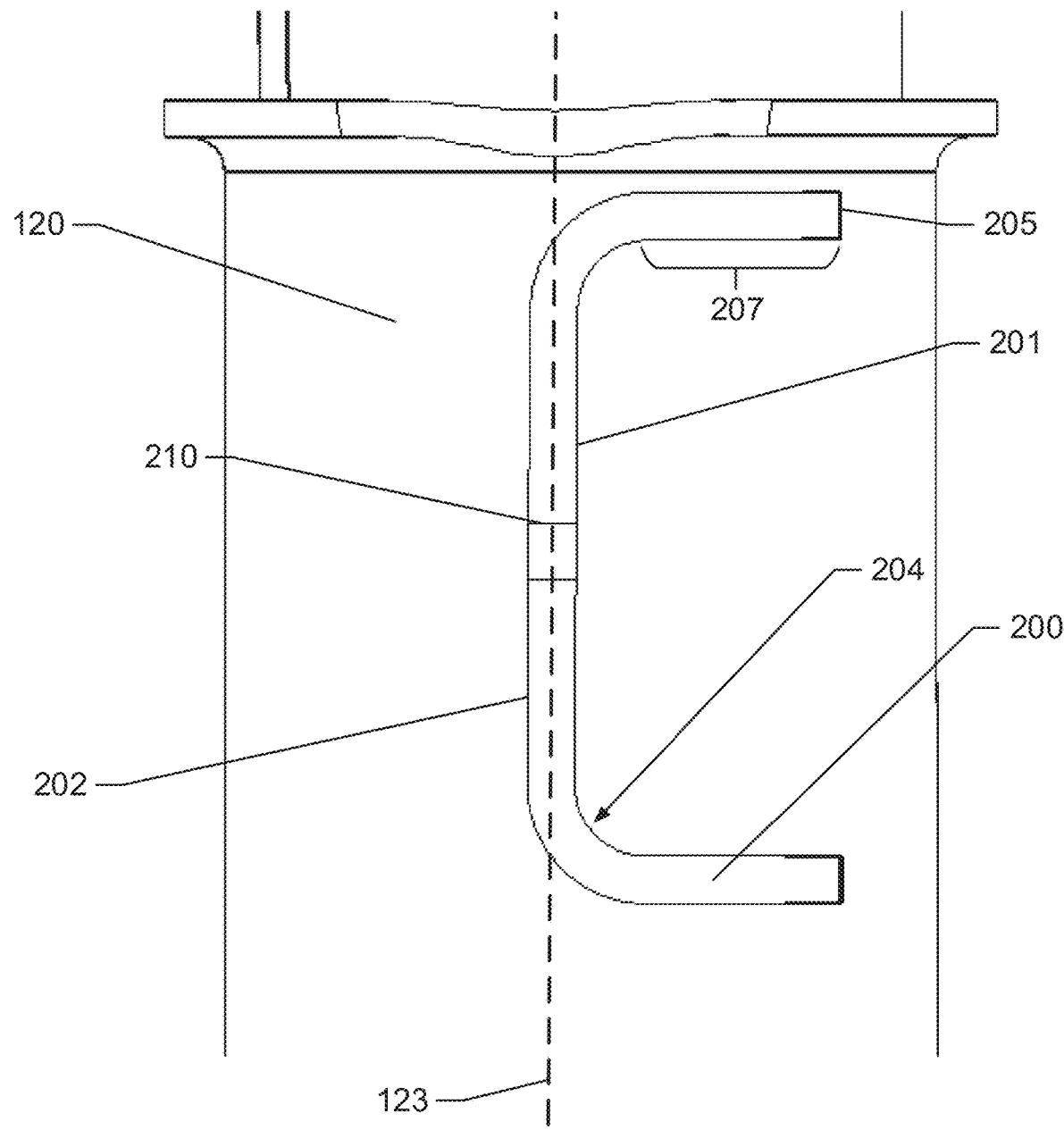
FIG. 7 illustrates a cross section side view of the strut stabilizer bar link bracket in accordance with an example embodiment.

The front side 201 of the strut stabilizer bar link bracket 200 may further be concave in structure, and may include a rim 205 that may extend around a perimeter of a concave structure 204 of the stabilizer bar link bracket 200. In some cases, the concave structure 204 may receive the first ball joint 170 therein, whereas in some other cases, the concave structure 204 may receive the fastener 220 therein. In an example embodiment, the strut stabilizer bar link bracket 200 may include a base portion. The base portion may be in the midplane 123 of the strut 120, and the base portion may include the receiving orifice 210. In some cases, a vehicle 110 may include a first side and a second side that may be opposite one another. Depending on the side of the vehicle 110, the concave structure 204 may receive the fastener 220 on a first side and the concave structure 204 may receive the first ball joint 170 on the second side. In an example embodiment, the concave structure 204 may be on one side of the midplane of the strut. The rim 205 may extend around 50% or more of the perimeter of the concave structure 204 of the strut stabilizer bar link bracket 200. In an example embodiment, the rim 205 may be further flanged. In other words, the rim 205 may angle inwards towards the receiving orifice 210 or outward away from the receiving orifice 210. In another example, the rim 205 may vary in depth along the perimeter of the concave structure 204 of the strut stabilizer bar link bracket 200, as shown in FIG. 5. The depth 207 of the rim may be defined from the top of the rim 205 to the beginning of the concave structure 204. In some cases, the depth of the rim may increase as distance to the strut decreases. In an example embodiment, the rim may extend substantially perpendicular to the midplane 123 of the strut 120. The rim may serve to protect the first ball joint 170 or the fastener 220 from debris or dust resulting from operation of the vehicle. The rim 205 may additionally reinforce the strut stabilizer bar link bracket 200 to prevent deformation during use. In some cases, the rim 205 may vary in thickness. Thus, the rim 205 and the concave structure 204 serve to enhance the strength of the strut stabilizer bar link bracket 200 while still allowing a relatively thin or light piece of metal to be employed for the construction thereof, but do so without making the strut stabilizer bar link bracket 200 "handed". Instead, the first ball joint 170 can be mated to the strut stabilizer bar link bracket 200 in either direction for installation on either side of the vehicle 110.

Figure 8:
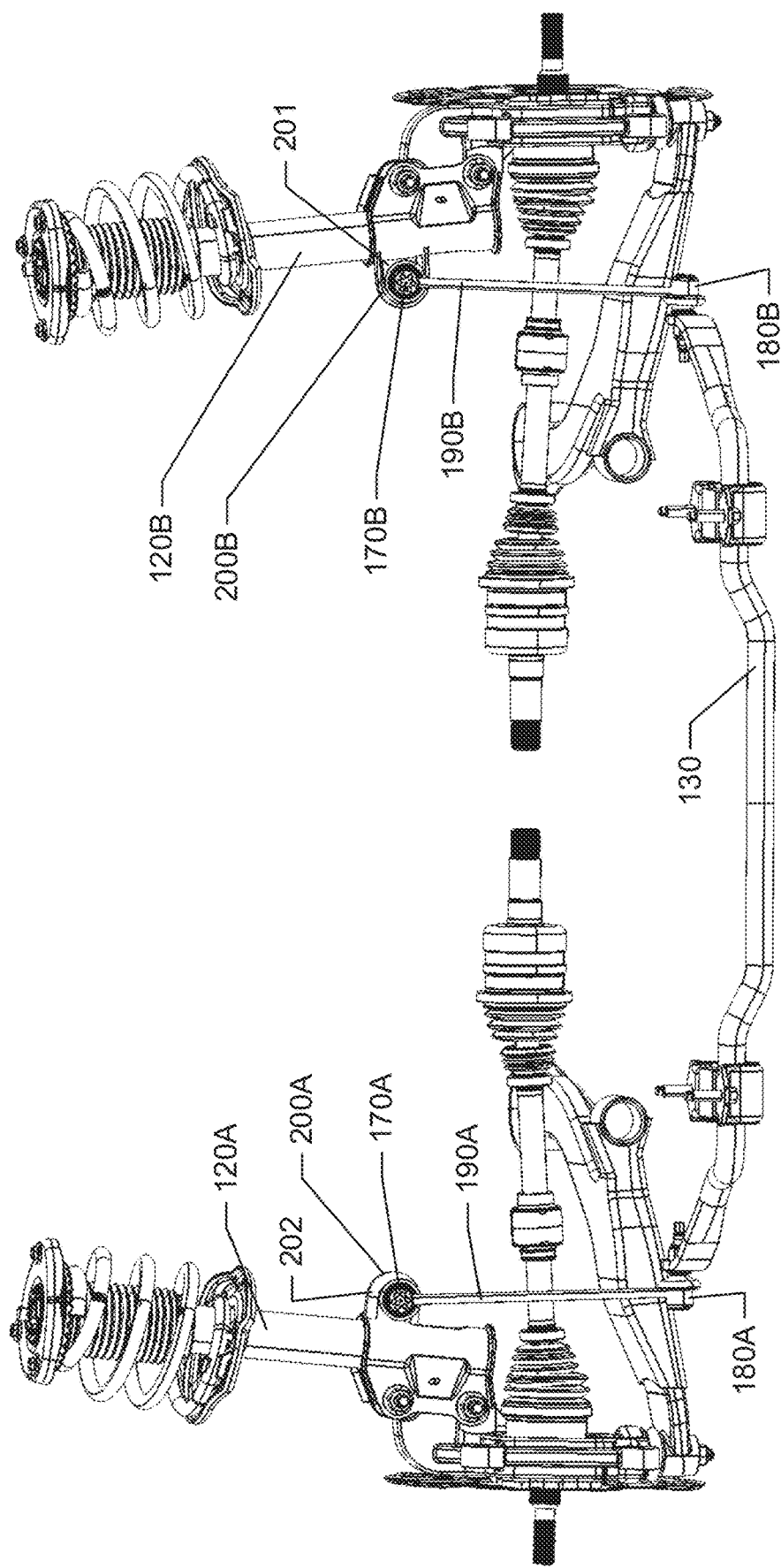
FIG. 8 illustrates a perspective view of the suspension assembly of the vehicle in accordance with an example embodiment.

In the example embodiment shown in FIG. 8, the vehicle 110 may include a first strut 120A and a second strut 120B. In some cases, the first strut 120A may be disposed on a diver side of the vehicle 110 and the second strut 120B may be disposed on a passenger side of the vehicle 110. Additionally, the vehicle 110 may include first and second strut stabilizer bar link brackets (200A, 200B) on respective sides of the first and second struts (120A, 120B). The same bracket structure may be used for the first strut stabilizer bar link bracket 200A and the second strut stabilizer bar link bracket 200B. However, the concave structure 204 may receive the fastener 220 at the first strut stabilizer bar link bracket 200A and may receive the first ball joint 170B at the second strut stabilizer bar link bracket 200B. In other words, the first and second strut stabilizer bar link brackets (200A, 200B) extends from the midplane of the first and second struts (120A, 120B) at both sides of the vehicle 110. Thus, the strut stabilizer bar link bracket 200 design and placement may reduce complexity of the suspension assembly while increasing efficiency and decreasing weight by being non-handed with only a single instance of the strut stabilizer bar link bracket 200 that can be used one both sides of the vehicle 110.

The strut stabilizer bar link bracket 200 may include a width (W), a length (L), and a height (H). The width (W) of the strut stabilizer bar link bracket 200 may be measured from the edge of the rim 205 to the back side 202 of the strut stabilizer bar link bracket 200. In some examples, a maximum value of the width (W) of the strut stabilizer bar link bracket 200 may be less than half of a diameter (D) of the strut 120. In an additional example, a maximum value of the length (L) of the strut stabilizer bar link bracket 200 may be less than the diameter (D) of the strut (120). In another example, a maximum value of the height (H) of the strut stabilizer bar link bracket 200 may be less than a maximum value of the length (L) of the strut stabilizer bar link bracket 200. The dimensions of the strut stabilizer bar link bracket 200 may help the overall performance of the suspension assembly by positioning the stabilizer bar link 140 proximate to the axis (midplane 123) of the strut 120 and the respective orientation of the remaining members of the suspension assembly.

A suspension assembly for a vehicle suspension system of an example embodiment may therefore be provided. The suspension assembly may include a strut operably coupled to a body of the vehicle, a stabilizer bar operably coupled to the strut to reduce body roll, a strut stabilizer bar link to operably couple the stabilizer bar to the strut; and a strut stabilizer bar link bracket. The suspension assembly may include the strut stabilizer bar link bracket extending from a midplane of the strut containing a longitudinal axis of the strut to operably couple the strut stabilizer bar link to the strut regardless of a side of the vehicle on which the strut is located. The strut stabilizer bar link may include a first ball joint to operably couple the strut stabilizer bar link to the strut stabilizer bar link bracket.

The suspension assembly of some embodiments may include additional features, modifications, augmentations and/or the like to achieve further objectives or enhance performance of the suspension assembly. The additional features, modifications, augmentations and/or the like may be added in any combination with each other. Below is a list of various additional features, modifications, and augmentations that can each be added individually or in any combination with each other. For example, the first ball joint is receivable at a front side of the strut stabilizer bar link bracket for installation at a first side of the vehicle and a back side of the strut stabilizer bar link bracket for installation at a second side of the vehicle. In an example embodiment, the strut stabilizer bar link bracket may include a receiving orifice to receive the first ball joint for installation at both the first side and the second side of the vehicle, and a concave structure that may receive the first ball joint inside the concave structure for installation at the first side of the vehicle and may receive a fastener operably coupled to the first ball joint for installation at the second side of the vehicle. In some cases, the concave structure may be on one side of the midplane of the strut. In an example embodiment, a rim may extend along a perimeter of the concave structure of strut stabilizer bar link bracket. In some cases, a depth of the rim from the concave structure increases as distance to the strut decreases. In an example embodiment, the rim may be substantially perpendicular to the midplane of the strut. In some cases, a shaft of the first ball joint may extend through the midplane of the strut. In an example embodiment, the suspension assembly may further include a second ball joint for operably coupling the strut stabilizer bar link to the stabilizer bar, and wherein the first ball joint and the second ball joint may be phased 90 degrees relative to each other. In some cases, the stabilizer bar link may extend away from the midplane of the strut from the first ball joint to the second ball joint. In an example embodiment, the strut stabilizer bar link and the strut may form an angle between 0 and 90 degrees. In some cases, a maximum width of the strut stabilizer bar link bracket may be less than half a diameter of the strut and a maximum height of the strut stabilizer bar link bracket may be less than a maximum length of the strut stabilizer bar link bracket.

A strut stabilizer bar link bracket for a suspension system of a vehicle may be provided. The strut stabilizer bar link bracket may include a receiving orifice to receive a first ball joint of a stabilizer bar link for installation at both a first side and a second side of the vehicle. The strut stabilizer bar link bracket may include a concave structure to receive the first ball joint inside the concave structure for installation at the first side of the vehicle and may receive a fastener operably coupled to the first ball joint for installation at the second side of the vehicle. The strut stabilizer bar link bracket may further extend from a midplane of the strut containing a longitudinal axis of the strut to operably couple the strut stabilizer bar link to the strut regardless of a side of the vehicle on which the strut is located.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:
1. A suspension assembly for a vehicle, the suspension assembly comprising:
a strut operably coupled to a body of the vehicle,
a stabilizer bar operably coupled to the strut to reduce body roll, a strut stabilizer bar link to operably couple the stabilizer bar to the strut; and a strut stabilizer bar link bracket extending from a midplane of the strut containing a longitudinal axis of the strut to operably couple the strut stabilizer bar link to the strut regardless of a side of the vehicle on which the strut is located, wherein the strut stabilizer bar link comprises a first ball joint to operably couple the strut stabilizer bar link to the strut stabilizer bar link bracket, and wherein the midplane of the strut is substantially parallel to a direction of extension of the stabilizer bar.

2. The suspension assembly of claim 1, wherein the first ball joint is receivable at a front side of the strut stabilizer bar link bracket for installation at a first side of the vehicle and a back side of the strut stabilizer bar link bracket for installation at a second side of the vehicle.

3. The suspension assembly of claim 2, wherein the strut stabilizer bar link bracket further comprises:
   a receiving orifice to receive the first ball joint for installation at both the first side and
   the second side of the vehicle, and
   a concave structure to receive the first ball joint inside the concave structure for installation at the first side of the vehicle and receive a fastener operably coupled to the first ball joint for installation at the second side of the vehicle.

4. The suspension assembly of claim 3, wherein the concave structure is on one side of the midplane of the strut.

5. The suspension assembly of claim 3, wherein a rim extends along a perimeter of the concave structure of strut stabilizer bar link bracket.

6. The suspension assembly of claim 5, wherein a depth of the rim from the concave structure increases as distance to the strut decreases.

7. The suspension assembly of claim 5, wherein the rim is substantially perpendicular to the midplane of the strut.

8. The suspension assembly of claim 1, wherein a shaft of the first ball joint extends through the midplane of the strut.

9. The suspension assembly of claim 1, further comprising a second ball joint for operably coupling the strut stabilizer bar link to the stabilizer bar, and wherein the first ball joint and the second ball joint are phased 90 degrees relative to each other.

10. The suspension assembly of claim 9, wherein the stabilizer bar link extends away from the midplane of the strut from the first ball joint to the second ball joint.

11. The suspension assembly of claim 1, wherein the strut stabilizer bar link and the strut forms an angle between 0 and 90 degrees.

12. A strut stabilizer bar link bracket for a suspension system of a vehicle, the stabilizer bar link bracket comprising:
    a receiving orifice to receive a first ball joint of a stabilizer bar link for installation at both a first side and a second side of the vehicle; and
    a concave structure to receive the first ball joint inside the concave structure for installation at the first side of the vehicle and receive a fastener operably coupled to the first ball joint for installation at the second side of the vehicle,
    wherein the strut stabilizer bar link bracket further extends from a midplane of a strut containing a longitudinal axis of the strut to operably couple a strut stabilizer bar link to the strut regardless of a side of the vehicle on which the strut is located,
    wherein the midplane of the strut is substantially parallel to a direction of extension of a stabilizer bar, and
    the wherein the stabilizer bar operably couples to the strut to reduce body roll.

13. The strut stabilizer bar link bracket of claim 12, wherein the first ball joint is receivable at a front side of the strut stabilizer bar link bracket for installation at the first side of the vehicle and a back side of the strut stabilizer bar link bracket for installation at the second side of the vehicle.

14. The strut stabilizer bar link bracket of claim 12, wherein the concave structure is on one side of the midplane of the strut.

15. The strut stabilizer bar link bracket of claim 12, wherein a rim extends along a perimeter of the concave structure of strut stabilizer bar link bracket.

16. The strut stabilizer bar link bracket of claim 15, wherein a depth of the rim from the concave structure increases as distance to the strut decreases.

17. The strut stabilizer bar link bracket of claim 15, wherein the rim is substantially perpendicular to the midplane of the strut.

18. The strut stabilizer bar link bracket of claim 12, wherein a shaft of the first ball joint extends through the midplane of the strut via strut stabilizer bar link bracket.

19. The strut stabilizer bar link bracket of claim 12, wherein the strut stabilizer bar link and the strut forms an angle between 0 and 90 degrees via the strut stabilizer bar link bracket.

20. The strut stabilizer bar link bracket of claim 12, wherein a maximum width of the strut stabilizer bar link bracket is less than half a diameter of the strut and a maximum height of the strut stabilizer bar link bracket is less than a maximum length of the strut stabilizer bar link bracket.

* * * * *